No. 795,523. PATENTED JULY 25, 1905.
J. G. LEASURE & D. T. SPRING.
COMBINATION TOOL FOR FIREMEN.
APPLICATION FILED APR. 14, 1904.

3 SHEETS—SHEET 1.

No. 795,523. PATENTED JULY 25, 1905.
J. G. LEASURE & D. T. SPRING.
COMBINATION TOOL FOR FIREMEN.
APPLICATION FILED APR. 14, 1904.

3 SHEETS—SHEET 2.

Witnesses:
J. P. Appleman
J. U. Lee

Inventors
D. T. Spring
J. G. Leasure
By H. E. Dunlap
Atty

No. 795,523. PATENTED JULY 25, 1905.
J. G. LEASURE & D. T. SPRING.
COMBINATION TOOL FOR FIREMEN.
APPLICATION FILED APR. 14, 1904.
3 SHEETS—SHEET 3.
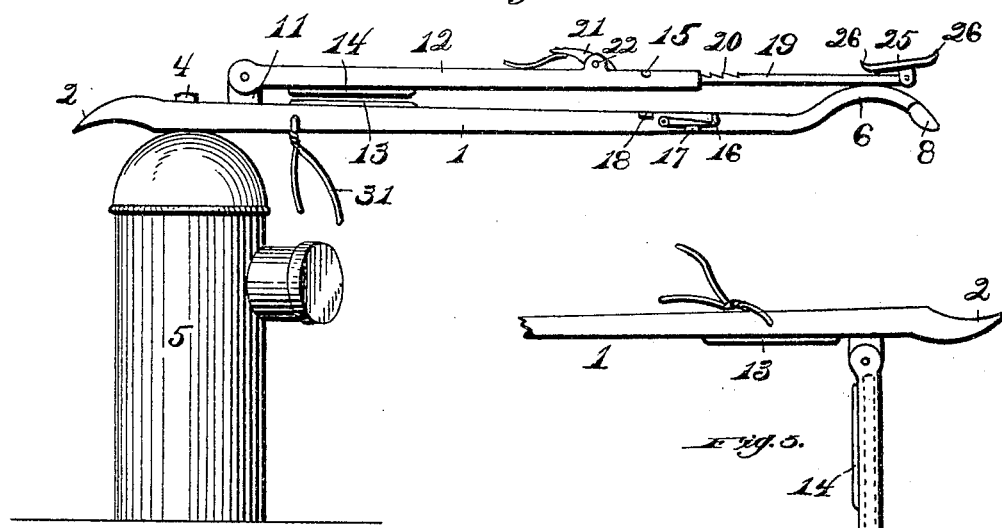
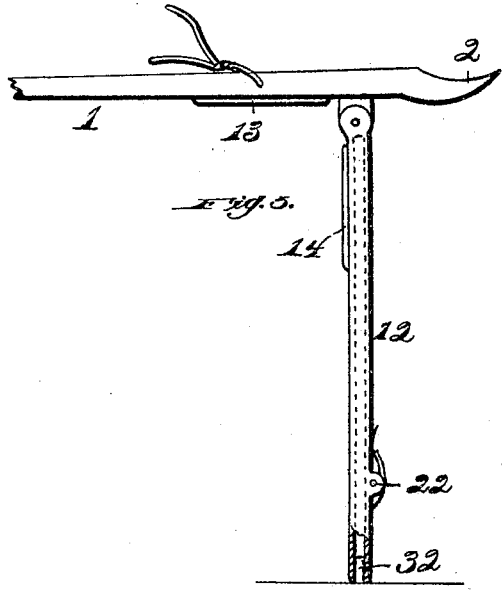
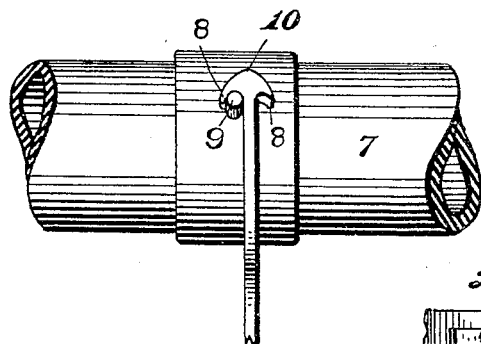
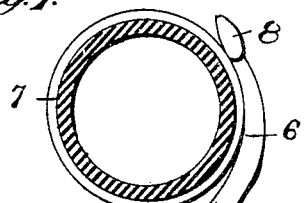
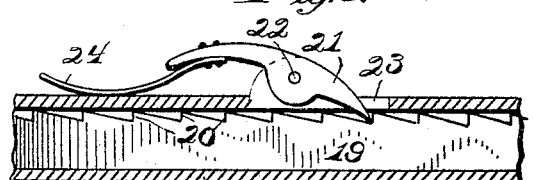
Witnesses:
J. P. Appleman
J. U. Lee.
Inventors.
D. T. Spring.
J. G. Leasure.
By N. C. Dunlap
Atty

UNITED STATES PATENT OFFICE.

JOHN GORDON LEASURE AND DANIEL TAYLOR SPRING, OF WHEELING, WEST VIRGINIA.

COMBINATION-TOOL FOR FIREMEN.

No. 795,523.　　　　Specification of Letters Patent.　　　　Patented July 25, 1905.

Application filed April 14, 1904. Serial No. 203,163.

*To all whom it may concern:*

Be it known that we, JOHN GORDON LEASURE and DANIEL TAYLOR SPRING, citizens of the United States of America, and residents of Wheeling, county of Ohio, and State of West Virginia, have invented certain new and useful Improvements in Combination-Tools for Firemen, of which the following is a specification.

Our invention relates to a new and useful combination-tool, and more particularly to a new and useful fireman's combination-tool; and it consists in the particular construction, arrangement, and combination of parts, which will hereinafter be fully described, and particularly pointed out in the appended claim.

The object of our invention is to provide a simple, durable, and comparatively inexpensive device combining several different necessary firemen's tools in a manner which renders it convenient and ready for instant use for any of the purposes to which it is adapted to be applied.

In describing our invention in detail reference is herein had to the accompanying drawings, forming a part of this specification, in which—

Figure 1:
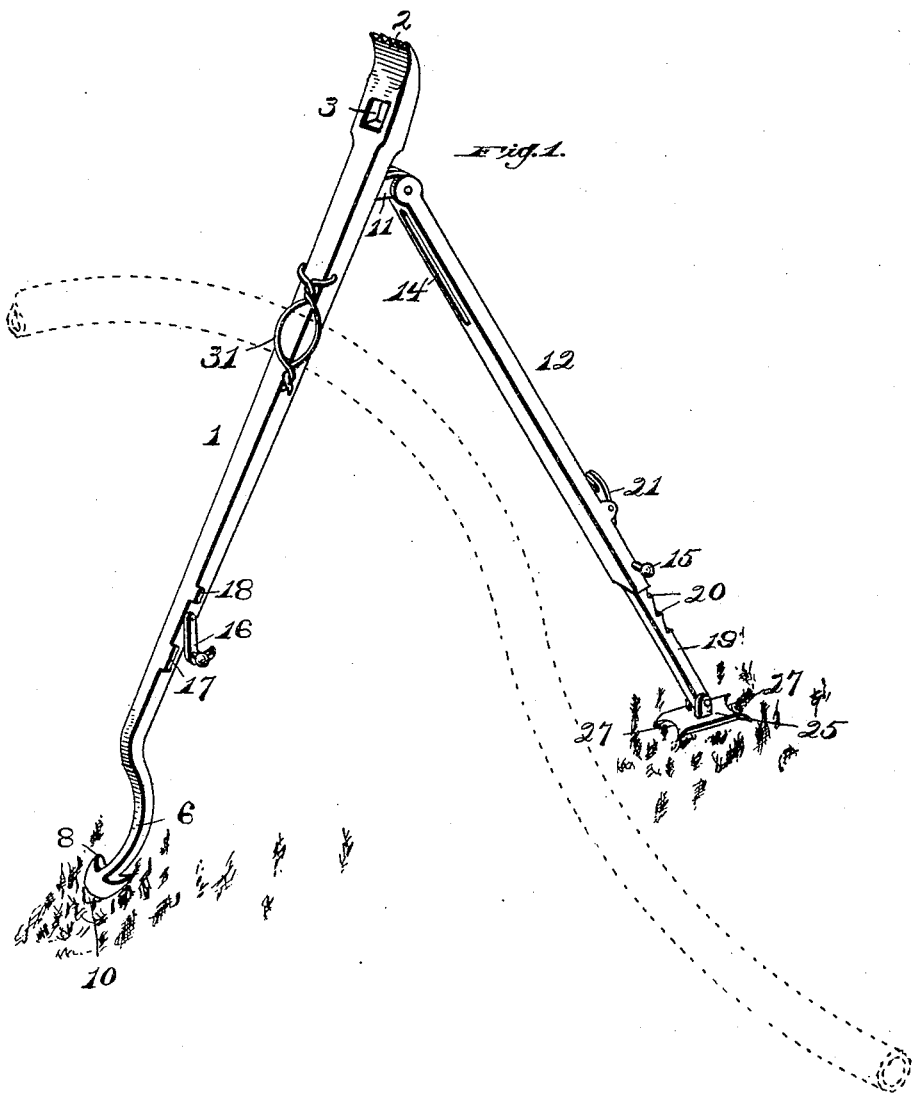
Figure 2:
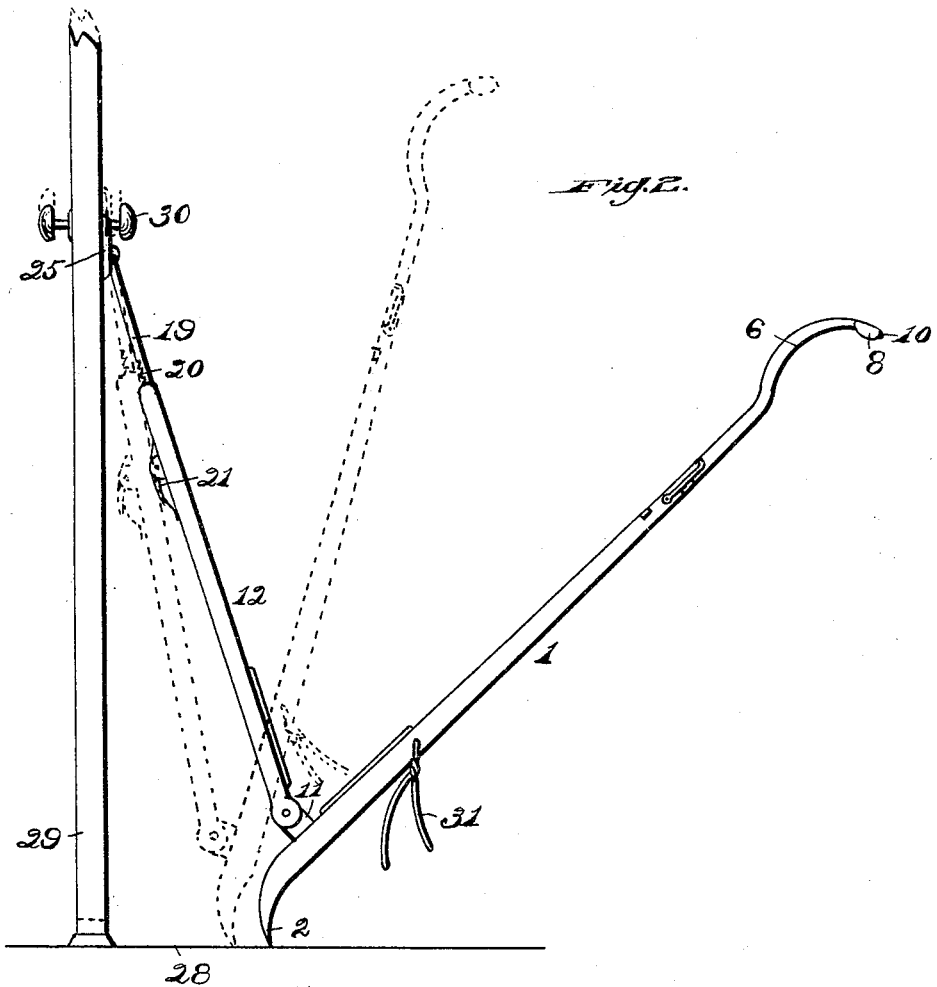
Figure 3:
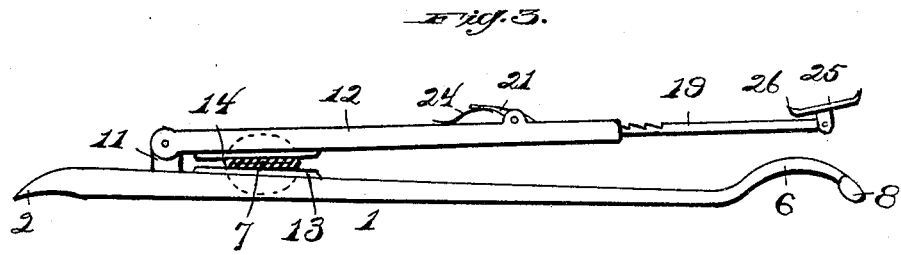

Figure 1 is a perspective view of our invention complete, showing the same as it appears when set up as a hose-support. Fig. 2 is a side elevation of the invention, showing it as it appears when used as a door-opener. Fig. 3 is a side elevation showing the application thereof as a hose-kinker. Fig. 4 is a similar elevation showing it applied as a plug or hydrant wrench. Fig. 5 is a similar elevation, partly in section, showing it applied as a wrench for turning on or off water at the ordinary street plug or hydrant. Fig. 6 is a front view showing the application of the device as a hose-spanner. Fig. 7 is a side view of the same. Fig. 8 is a top plan view of the pawl for engaging the ratchet-toothed bar, and Fig. 9 is a sectional view showing said pawl and ratchet-toothed bar in side elevation.

Referring to said drawings, in which like reference-numerals designate like parts throughout the several views, 1 indicates a longitudinal main bar, the same being of any desired suitable shape, but preferably rectangular in cross-section, as illustrated. The front end of said bar 1 is beveled and curved, forming a crowbar-point 2, thus adapting said bar for use as a crowbar. In said bar 1 at the rear of said point 2 is provided an opening 3, in which the valve-stem 4 of a fire plug or hydrant 5 is adapted to fit. By applying the device as shown in Fig. 4 it serves the purpose of a plug or hydrant wrench. The rear end of said main bar 1 is bent or curved backward, as shown at 6, to correspond with the peripheral curvature of the fire-hose 7 and has at each side of the point thereof an integral jaw 8, adapted for engaging the usual stud 9 on said fire-hose, said curved end and jaws serving as a hose-spanner, which is operative in the ordinary manner. The jaws 8 on the opposite sides of the point are preferably of different sizes, so as to better adapt the said device for engaging different-sized studs 9. The extreme rear end of the said main bar 1 is provided with a spud-point 10, the object of which will presently be shown.

Pivoted to an integral lug 11, carried on the upper face of the main bar 1, near the point 2 thereof, is one end of a tubular bar 12, which may be of any desired shape, but which is preferably rectangular in cross-section, as illustrated. On the upper face of said main bar 1, slightly in the rear of the lug 11, is a longitudinal rib or swell or ridge 13, adapted to reciprocate with a corresponding rib or ridge 14, carried by the under face of the tubular bar 12.

In using the device as a hose-kinker, as shown in Fig. 3, the same is made to straddle the hose 7, and the two bars 1 and 12 are forced together, with the ridges 13 and 14 across said hose, thus completely compressing the sides thereof and cutting off the flow of water through said hose. As a means for securely holding the bars 1 and 12 together when such is desired a stud 15 is provided on one or the other of said bars, said stud being adapted to be engaged by a hook 16, pivoted on the opposite bar. To prevent said pivoted hook when free from swinging about, a rear stud 17 and a forward stud 18, past which said hook cannot swing, are provided on the bar, on which said hook is pivoted.

In the tubular bar 12 is an adjustable close-fitting rod or bar 19, one of the faces of which is provided with ratchet-teeth 20, adapted to be engaged by the point of a pawl 21, suitably pivoted at 22 over an opening or slot 23 in the corresponding face of the said bar 12. Said pawl 21 is normally held in engagement with the ratchet-teeth 20 in any suitable manner, but preferably by a bent spring 24, having one end secured to the rear end of the pawl and the rounded bent face thereof resting on the face of said bar 12.

Pivoted in a suitable manner upon the outer end of the rod 19 is a plate 25, substantially as illustrated, having preferably integral outwardly-extending teeth 26. Said plate 25 is preferably provided with an inwardly-extending rounded recess 27 in each end thereof.

When using the device as a door-opener, as illustrated in Fig. 2, the end 2 of the main bar 1 is set on the floor 28 a short distance from the base of the door 29, the rod 19 is adjusted with relation to the position of the panel or other portion of the door which it is desired to break or burst, and the plate 25 is set against said panel or other portion of the door with the teeth 26 thereof engaging it, or if it is desired to break the lock the plate 25 is set underneath the knob 30, with the knob-spindle in the recess 27 thereof. Then by raising or forcing upward the rear end of the bar 1 with the floor 28 as a fulcrum the door or lock is broken.

When using the device as a support for hose, the free ends of the bars 1 and 12 are separated, the spud-point 10 is driven into the ground, and the plate 25 is set upon the ground with the teeth 26 engaging it. A loop of wire or similar material 31, which is provided on one of the bars near the point at which said bars are pivoted together, is then secured about the hose, when said hose will be supported substantially in the manner illustrated in Fig. 1, the hose being shown in dotted lines in said figure.

When using the device for a wrench for operating a street-plug, the toothed bar 19 is withdrawn entirely from the tubular bar 12. The open end of said bar 12 is then fitted over the valve-stem 32 of the plug, as shown in Fig. 5, when, using the bar 1 as a handle, the same being held in a horizontal position, the said valve may be operated in the ordinary manner.

From the foregoing it will be seen that we provide an extremely simple and convenient tool or combination of tools in one device. Furthermore, it will be seen that various minor changes may be made in the details of construction and in the arrangement of the parts without departing from the spirit or scope of the invention. Hence we do not wish to limit ourselves to the precise construction and arrangement of parts herein shown and described.

Having thus described our invention, what we claim as new, and desire to secure by Letters Patent, is—

A fireman's tool comprising a bar having an arrow-shaped anchor on one end, a second bar pivoted thereto, anchoring means on said second bar, and a hose-supporting means on the first-named bar.

Signed by us in the presence of two subscribing witnesses.

JOHN GORDON LEASURE.
DANIEL TAYLOR SPRING.

Witnesses:
  ROBT. F. DILWORTH,
  H. E. DUNLAP.